US009062241B2

(12) United States Patent (10) Patent No.: US 9,062,241 B2
Zamora et al. (45) Date of Patent: Jun. 23, 2015

(54) WEIGHT MATERIALS FOR USE IN CEMENT, SPACER AND DRILLING FLUIDS

(75) Inventors: Frank Zamora, San Antonio, TX (US); Marilyn J. Bramblett, George West, TX (US); Mario B. Hernandez, San Antonio, TX (US); Sarkis R. Kakadjian, San Antonio, TX (US); Ron Powell, Humble, TX (US); Olusegun Matthew Falana, San Antonio, TX (US)

(73) Assignee: Clearwater International LLC, Houston, TX (US)

( * ) Notice: Subject to any disclaimer, the term of this patent is extended or adjusted under 35 U.S.C. 154(b) by 561 days.

(21) Appl. No.: 12/892,584

(22) Filed: Sep. 28, 2010

(65) Prior Publication Data

US 2012/0073813 A1 Mar. 29, 2012

(51) Int. Cl.
| | |
|---|---|
| *C04B 14/34* | (2006.01) |
| *C09K 8/48* | (2006.01) |
| *C04B 28/02* | (2006.01) |
| *C09K 8/03* | (2006.01) |
| *C09K 8/40* | (2006.01) |
| *C09K 8/493* | (2006.01) |

(52) U.S. Cl.
CPC . *C09K 8/48* (2013.01); *C04B 28/02* (2013.01); *C09K 8/032* (2013.01); *C09K 8/40* (2013.01); *C09K 8/493* (2013.01); *C09K 2208/32* (2013.01)

(58) Field of Classification Search
CPC ...... C04B 14/308; C04B 14/34; C04B 14/48; C04B 14/28; C04B 14/06; C09K 8/032; C09K 8/40; C09K 8/48

USPC .......................................................... 106/713
See application file for complete search history.

(56) References Cited

U.S. PATENT DOCUMENTS

| | | | | |
|---|---|---|---|---|
| 1,837,614 | A | * 12/1931 | Gramberg | ...................... 106/623 |
| 2,196,042 | A | 4/1940 | Timpson | ........................... 23/11 |
| 2,390,153 | A | 12/1945 | Kern | ............................... 260/72 |
| 3,059,909 | A | 10/1962 | Wise | ............................ 261/39.3 |
| 3,163,219 | A | 12/1964 | Wyant et al. | ................... 166/283 |
| 3,301,723 | A | 1/1967 | Chrisp | ............................ 149/20 |
| 3,301,848 | A | 1/1967 | Halleck | ....................... 536/123.1 |
| 3,303,896 | A | 2/1967 | Tillotson et al. | ................. 175/69 |
| 3,317,430 | A | 5/1967 | Priestley et al. | .............. 510/503 |

(Continued)

FOREIGN PATENT DOCUMENTS

| | | |
|---|---|---|
| CA | 2125513 | 1/1995 |
| CA | 2696375 A1 | 9/2010 |

(Continued)

OTHER PUBLICATIONS

JP 2004051399 A Murai (Feb. 19, 2004) abstract only.*

(Continued)

*Primary Examiner* — Paul Marcantoni
(74) *Attorney, Agent, or Firm* — Robert W Strozier

(57) ABSTRACT

A drilling fluid, spacer fluid and cementing compositions for use in subterranean wells are disclosed along with methods for making using same, where the compositions include a weighting system having an effective amount of a metal silicon alloy, mixtures of metal silicon alloys, or mixtures of metal silicon alloys and conventional weighting agents, to produce compositions having a desired high density, while retaining other fluid properties such as pumpability, gas tight sealing, low tendency to segregate, and reduced high temperature cement strength retrogression.

10 Claims, 2 Drawing Sheets

(56) References Cited

U.S. PATENT DOCUMENTS

| | | | | |
|---|---|---|---|---|
| 3,446,614 A | * | 5/1969 | Johnson | 75/310 |
| 3,565,176 A | | 2/1971 | Wittenwyler | 166/270 |
| 3,856,921 A | | 12/1974 | Shrier et al. | 423/228 |
| 3,867,161 A | * | 2/1975 | Torii et al. | 106/642 |
| 3,888,312 A | | 6/1975 | Tiner et al. | 166/308.5 |
| 3,933,205 A | | 1/1976 | Kiel | 166/308.1 |
| 3,937,283 A | | 2/1976 | Blauer et al. | 166/307 |
| 3,957,501 A | * | 5/1976 | Matsuda et al. | 106/605 |
| 3,960,736 A | | 6/1976 | Free et al. | 507/216 |
| 3,965,982 A | | 6/1976 | Medlin | 166/249 |
| 3,990,978 A | | 11/1976 | Hill | 507/235 |
| 4,007,792 A | | 2/1977 | Meister | 166/308.2 |
| 4,052,159 A | | 10/1977 | Fuerst et al. | |
| 4,067,389 A | | 1/1978 | Savins | 166/246 |
| 4,108,782 A | | 8/1978 | Thompson | 507/205 |
| 4,112,050 A | | 9/1978 | Sartori et al. | 423/223 |
| 4,112,051 A | | 9/1978 | Sartori et al. | 423/223 |
| 4,112,052 A | | 9/1978 | Sartori et al. | 423/223 |
| 4,113,631 A | | 9/1978 | Thompson | 507/202 |
| 4,378,845 A | | 4/1983 | Medlin et al. | 166/297 |
| 4,385,935 A | * | 5/1983 | Skjeldal | 106/607 |
| 4,461,716 A | | 7/1984 | Barbarin et al. | 252/307 |
| 4,479,041 A | | 10/1984 | Fenwick et al. | 200/81 R |
| 4,506,734 A | | 3/1985 | Nolte | 166/308.1 |
| 4,514,309 A | | 4/1985 | Wadhwa | 507/211 |
| 4,540,438 A | * | 9/1985 | Gutmann et al. | 106/643 |
| 4,541,935 A | | 9/1985 | Constien et al. | 507/225 |
| 4,549,608 A | | 10/1985 | Stowe et al. | 166/280.1 |
| 4,561,985 A | | 12/1985 | Glass, Jr. | 507/108 |
| 4,623,021 A | | 11/1986 | Stowe | 166/250.1 |
| 4,654,266 A | | 3/1987 | Kachnik | 428/403 |
| 4,657,081 A | | 4/1987 | Hodge | 166/380.5 |
| 4,660,643 A | | 4/1987 | Perkins | 166/283 |
| 4,683,068 A | | 7/1987 | Kucera | 507/201 |
| 4,686,052 A | | 8/1987 | Baranet et al. | 507/244 |
| 4,695,389 A | | 9/1987 | Kubala | 507/244 |
| 4,705,113 A | | 11/1987 | Perkins | 166/302 |
| 4,714,115 A | | 12/1987 | Uhri | 166/308.1 |
| 4,718,490 A | | 1/1988 | Uhri | 166/281 |
| 4,724,905 A | | 2/1988 | Uhri | 166/250.1 |
| 4,725,372 A | | 2/1988 | Teot et al. | 507/129 |
| 4,739,834 A | | 4/1988 | Peiffer et al. | 166/308.4 |
| 4,741,401 A | | 5/1988 | Walles et al. | 166/300 |
| 4,748,011 A | | 5/1988 | Baize | 423/228 |
| 4,779,680 A | | 10/1988 | Sydansk | 166/300 |
| 4,795,574 A | | 1/1989 | Syrinek et al. | 507/238 |
| 4,817,717 A | | 4/1989 | Jennings, Jr. et al. | 166/278 |
| 4,830,106 A | | 5/1989 | Uhri | 166/250.1 |
| 4,846,277 A | | 7/1989 | Khalil et al. | 166/280.1 |
| 4,848,468 A | | 7/1989 | Hazlett et al. | 166/300 |
| 4,852,650 A | | 8/1989 | Jennings, Jr. et al. | 166/250.1 |
| 4,869,322 A | | 9/1989 | Vogt, Jr. et al. | 166/280.1 |
| 4,892,147 A | | 1/1990 | Jennings, Jr. et al. | 166/280.2 |
| 4,926,940 A | | 5/1990 | Stromswold | 166/247 |
| 4,933,031 A | * | 6/1990 | Blomberg et al. | 106/679 |
| 4,935,060 A | * | 6/1990 | Dingsoyr | 106/719 |
| 4,938,286 A | | 7/1990 | Jennings, Jr. | 166/280.1 |
| 4,978,512 A | | 12/1990 | Dillon | 423/226 |
| 5,005,645 A | | 4/1991 | Jennings, Jr. et al. | 166/280.1 |
| 5,024,276 A | | 6/1991 | Borchardt | 166/308.6 |
| 5,067,556 A | | 11/1991 | Fudono et al. | 62/196.4 |
| 5,074,359 A | | 12/1991 | Schmidt | 166/280.1 |
| 5,074,991 A | | 12/1991 | Weers | 208/236 |
| 5,082,579 A | | 1/1992 | Dawson | 507/211 |
| 5,106,518 A | | 4/1992 | Cooney et al. | 507/21 |
| 5,110,486 A | | 5/1992 | Manalastas et al. | 507/260 |
| 5,169,411 A | | 12/1992 | Weers | 44/421 |
| 5,224,546 A | | 7/1993 | Smith et al. | 166/300 |
| 5,228,510 A | | 7/1993 | Jennings, Jr. et al. | 166/263 |
| 5,246,073 A | | 9/1993 | Sandiford et al. | 166/295 |
| 5,259,455 A | | 11/1993 | Nimerick et al. | 166/308.5 |
| 5,330,005 A | | 7/1994 | Card et al. | 166/280.2 |
| 5,342,530 A | | 8/1994 | Aften et al. | 252/8.551 |
| 5,347,004 A | | 9/1994 | Rivers et al. | 544/180 |
| 5,363,919 A | | 11/1994 | Jennings, Jr. | 166/308.1 |
| 5,402,846 A | | 4/1995 | Jennings, Jr. et al. | 166/259 |
| 5,411,091 A | | 5/1995 | Jennings, Jr. | 166/280.1 |
| 5,424,284 A | | 6/1995 | Patel et al. | 507/129 |
| 5,439,055 A | | 8/1995 | Card et al. | 166/280.2 |
| 5,462,721 A | | 10/1995 | Pounds et al. | 423/226 |
| 5,465,792 A | | 11/1995 | Dawson et al. | 166/295 |
| 5,472,049 A | | 12/1995 | Chaffe et al. | 166/250.1 |
| 5,482,116 A | | 1/1996 | El-Rabaa et al. | 166/250.1 |
| 5,488,083 A | | 1/1996 | Kinsey, III et al. | 507/211 |
| 5,497,831 A | | 3/1996 | Hainey et al. | 166/308.1 |
| 5,501,275 A | | 3/1996 | Card et al. | 166/280.2 |
| 5,551,516 A | | 9/1996 | Norman et al. | 166/308.2 |
| 5,624,886 A | | 4/1997 | Dawson et al. | 507/217 |
| 5,635,458 A | | 6/1997 | Lee et al. | 507/240 |
| 5,649,596 A | | 7/1997 | Jones et al. | 166/300 |
| 5,669,447 A | | 9/1997 | Walker et al. | 166/300 |
| 5,674,377 A | | 10/1997 | Sullivan, III et al. | 208/208 R |
| 5,688,478 A | | 11/1997 | Pounds et al. | 423/228 |
| 5,693,837 A | | 12/1997 | Smith et al. | 556/148 |
| 5,711,396 A | | 1/1998 | Joerg et al. | 180/444 |
| 5,722,490 A | | 3/1998 | Ebinger | 166/281 |
| 5,744,024 A | | 4/1998 | Sullivan, III et al. | 208/236 |
| 5,755,286 A | | 5/1998 | Ebinger | 166/281 |
| 5,775,425 A | | 7/1998 | Weaver et al. | 166/276 |
| 5,787,986 A | | 8/1998 | Weaver et al. | 166/280.2 |
| 5,806,597 A | | 9/1998 | Tjon-Joe-Pin et al. | 166/300 |
| 5,807,812 A | | 9/1998 | Smith et al. | 507/238 |
| 5,833,000 A | | 11/1998 | Weaver et al. | 166/276 |
| 5,853,048 A | | 12/1998 | Weaver et al. | 166/279 |
| 5,871,049 A | | 2/1999 | Weaver et al. | 166/276 |
| 5,877,127 A | | 3/1999 | Card et al. | 507/273 |
| 5,908,073 A | | 6/1999 | Nguyen et al. | 166/276 |
| 5,908,814 A | | 6/1999 | Patel et al. | 507/131 |
| 5,964,295 A | | 10/1999 | Brown et al. | 166/308.2 |
| 5,979,557 A | | 11/1999 | Card et al. | 166/300 |
| 5,980,845 A | | 11/1999 | Cherry | 423/229 |
| 5,993,508 A | * | 11/1999 | Stephan | 75/314 |
| 6,016,871 A | | 1/2000 | Burts, Jr. | 166/300 |
| 6,035,936 A | | 3/2000 | Whalen | 166/308.5 |
| 6,047,772 A | | 4/2000 | Weaver et al. | 166/276 |
| 6,054,417 A | | 4/2000 | Graham et al. | 507/238 |
| 6,059,034 A | | 5/2000 | Rickards et al. | 166/280.2 |
| 6,060,436 A | | 5/2000 | Synder et al. | 507/266 |
| 6,069,118 A | | 5/2000 | Hinkel et al. | 507/277 |
| 6,123,394 A | | 9/2000 | Jeffrey | 299/16 |
| 6,133,205 A | | 10/2000 | Jones | 507/276 |
| 6,147,034 A | | 11/2000 | Jones et al. | 507/238 |
| 6,162,449 A | | 12/2000 | Maier et al. | 424/401 |
| 6,162,766 A | | 12/2000 | Muir et al. | 507/267 |
| 6,169,058 B1 | | 1/2001 | Le et al. | 507/222 |
| 6,228,812 B1 | | 5/2001 | Dawson et al. | 507/221 |
| 6,247,543 B1 | | 6/2001 | Patel et al. | 175/64 |
| 6,267,938 B1 | | 7/2001 | Warrender et al. | 423/226 |
| 6,283,212 B1 | | 9/2001 | Hinkel et al. | 166/279 |
| 6,291,405 B1 | | 9/2001 | Lee et al. | 507/136 |
| 6,330,916 B1 | | 12/2001 | Rickards et al. | 166/280.2 |
| 6,725,931 B2 | | 4/2004 | Nguyen et al. | 166/280.2 |
| 6,756,345 B2 | | 6/2004 | Pakulski et al. | 507/246 |
| 6,793,018 B2 | | 9/2004 | Dawson et al. | 166/300 |
| 6,832,650 B2 | | 12/2004 | Nguyen et al. | 166/279 |
| 6,875,728 B2 | | 4/2005 | Gupta et al. | 507/240 |
| 7,140,433 B2 | | 11/2006 | Gatlin et al. | 166/250.01 |
| 7,156,173 B2 | | 1/2007 | Mueller | |
| 7,268,100 B2 | | 9/2007 | Kippie et al. | 507/244 |
| 7,350,579 B2 | | 4/2008 | Gatlin et al. | 166/308.3 |
| 7,392,847 B2 | | 7/2008 | Gatlin et al. | 166/280.2 |
| 7,517,447 B2 | | 4/2009 | Gatlin | 208/236 |
| 7,565,933 B2 | | 7/2009 | Kippie et al. | |
| 7,566,686 B2 | | 7/2009 | Kippie et al. | 507/213 |
| 7,712,535 B2 | | 5/2010 | Venditto et al. | |
| 7,767,628 B2 | | 8/2010 | Kippie et al. | 507/102 |
| 2002/0049256 A1 | | 4/2002 | Bergeron, Jr. | 514/674 |
| 2002/0165308 A1 | | 11/2002 | Kinniard et al. | 524/492 |
| 2003/0220204 A1 | | 11/2003 | Baran, Jr. et al. | 507/200 |
| 2005/0045330 A1 | | 3/2005 | Nguyen et al. | 166/281 |
| 2005/0092489 A1 | | 5/2005 | Welton et al. | 166/280.2 |
| 2005/0137114 A1 | | 6/2005 | Gatlin et al. | 510/424 |
| 2005/0250666 A1 | | 11/2005 | Gatlin et al. | 510/492 |
| 2006/0194700 A1 | | 8/2006 | Gatlin et al. | 507/203 |

(56) References Cited

U.S. PATENT DOCUMENTS

| | | | |
|---|---|---|---|
| 2007/0032693 A1 | 2/2007 | Gatlin et al. | 507/239 |
| 2007/0173413 A1 | 7/2007 | Lukocs et al. | 507/238 |
| 2007/0173414 A1 | 7/2007 | Wilson, Jr. | 507/131 |
| 2008/0197085 A1 | 8/2008 | Wanner et al. | |
| 2008/0251252 A1 | 10/2008 | Schwartz | |
| 2008/0257553 A1 | 10/2008 | Gatlin et al. | 166/280.2 |
| 2008/0257554 A1 | 10/2008 | Zamora et al. | |
| 2008/0269082 A1 | 10/2008 | Wilson, Jr. et al. | |
| 2008/0283242 A1 | 11/2008 | Ekstrand et al. | |
| 2008/0287325 A1 | 11/2008 | Thompson et al. | |
| 2008/0314124 A1 | 12/2008 | Sweeney et al. | |
| 2008/0318812 A1 | 12/2008 | Kakadjian et al. | |
| 2009/0067931 A1 | 3/2009 | Curr et al. | |
| 2009/0151959 A1 | 6/2009 | Darnell et al. | |
| 2009/0200027 A1 | 8/2009 | Kakadjian et al. | |
| 2009/0200033 A1 | 8/2009 | Kakadjian et al. | |
| 2009/0203553 A1 | 8/2009 | Gatlin et al. | |
| 2009/0250659 A1 | 10/2009 | Gatlin | 208/236 |
| 2009/0275488 A1 | 11/2009 | Zamora et al. | |
| 2010/0000795 A1 | 1/2010 | Kakadjian et al. | |
| 2010/0012901 A1 | 1/2010 | Falana et al. | |
| 2010/0077938 A1 | 4/2010 | Zamora et al. | |
| 2010/0122815 A1 | 5/2010 | Zamora et al. | |
| 2010/0181071 A1 | 7/2010 | van Petegen | |
| 2010/0197968 A1 | 8/2010 | Falana et al. | |
| 2010/0212905 A1 | 8/2010 | van Petegen | |
| 2010/0252262 A1 | 10/2010 | Ekstrand et al. | |

FOREIGN PATENT DOCUMENTS

| | | | |
|---|---|---|---|
| DE | 4027300 | 5/1992 | B10D 53/14 |
| ES | 8609174 | 6/1985 | |
| FR | 2529873 B1 | 10/1985 | |
| GB | 685563 A | 1/1953 | |
| GB | 775376 | 10/1954 | |
| GB | 1073338 A | 6/1967 | |
| JP | 10001461 | 6/1988 | C07C 211/50 |
| JP | 3075251 A | 3/1991 | |
| JP | 08151422 | 11/1996 | |
| JP | 10110115 A | 4/1998 | |
| JP | 2005194148 A | 7/2005 | |
| SU | 1652508 A1 | 5/1991 | |
| WO | WO 98/56497 | 12/1998 | |

OTHER PUBLICATIONS

JP 45007185 B Yamazaki (Mar. 12, 1970) abstract only.*
CS 129563 (Oct. 15, 1968) No author available, abstract only.*
RU 2142924 C1 Bargov et al. (Dec. 20, 1999) abstract only.*
JP 11302065 A Aoki et al. (Nov. 22, 1998) abstract only.*
SU 1643509 A Kats et al. (Apr. 23, 1991) abstract only.*
SU 893943 B (Dec. 20, 1981) abstract only.*
JP 56149361 A (Nov. 19, 1981) abstract only.*
JP 55003325 A (Jan. 11, 1980) abstract only.*
U.S. Appl. No. 12/750,335, filed Mar. 30, 2010, Parker.
U.S. Appl. No. 12/473,805, filed May 28, 2009, Falana et al.
U.S. Appl. No. 12/510,101, filed Jul. 27, 2009, Falana et al.
U.S. Appl. No. 12/479,486, filed Jun. 5, 2009, Kakadjian et al.
U.S. Appl. No. 12/465,437, filed May 13, 2009, Kakadjian.
U.S. Appl. No. 12/497,399, filed Jul. 2, 2009, Falana et al.
U.S. Appl. No. 12/784,479, filed May 20, 2010, Zamora et al.
U.S. Appl. No. 12/832,222, filed Jul. 8, 2010, van Petegen.
U.S. Appl. No. 12/758,466, filed Apr. 12, 2010, Thompson et al.
U.S. Appl. No. 12/885,062, filed Sep. 17, 2010, Falana et al.
U.S. Appl. No. 12/885,102, filed Sep. 17, 2010, Falana et al.
U.S. Appl. No. 12/885,128, filed Sep. 17, 2010, Falana et al.
Canadian Counterpart Office Action.
Russian Counterpart Office Actions.

* cited by examiner

WEIGHT MATERIALS FOR USE IN CEMENT, SPACER AND DRILLING FLUIDS

BACKGROUND OF THE INVENTION

1. Field of the Invention

Embodiments of this invention relate to environmentally compatible materials used in fluid compositions such as drilling fluids, drilling muds, kill fluids, and cement compositions for oil, gas, water, or geothermal wells or the like that have a desired high density, while retaining other fluid properties such as pumpability, gas tight sealing, low tendency to segregate, and reduced high temperature cement strength retrogression. Embodiments of this invention also relate to densified fluid compositions suitable for cementing zones, which are subjected to extreme static or dynamic stresses. Embodiments of this invention also relate to fluid compositions for use in the drilling and completion of oil and gas wells, which form a buffer between and prevent the mixing of various fluids used in the drilling and completion of oil and gas wells so called spacer fluids.

More precisely, embodiments of this invention relate to environmentally compatible materials used in fluid compositions such as drilling fluids, drilling muds, kill fluids, and cementing compositions for oil, gas, water, injection, geothermal wells and/or other subterranean wells, where the compositions include a weighting or densifying system including at least one metal silicon alloy or a mixture of metal silicon alloys. Other embodiments of the weighting system of this invention may include metal silicon alloy or mixtures of metal silicon alloys along with other conventional densifying agents so that a density of the resulting fluid composition and an amount of the weighting system added to the fluid composition may be adjusted to achieve desired final fluid composition properties.

2. Description of the Related Art

During the drilling of deep oil and gas wells, over-pressured (or geopressured) zones are occasionally penetrated. In cases where the pressure gradient of these zones exceeds the hydrostatic pressure, fluids that use conventional densifing or weighting agents with Specific Gravity of less than 6 can be used to control the pressure, however in many cases these conventional weighing agent will not achieve the required fluid properties needed to complete the well and are often not effective where the exposed zones have a low parting pressure.

Many problems are incurred when drilling into over-pressurized zones with mud too light to hold back the gas pressure. Such resulting conditions range from gasified mud (in low permeability formations), controllable kicks which are successfully stopped by closing blow-out preventors, to uncontrollable blow-outs. To counteract the over-pressurized zones, high density fluid is pumped into the annulus (backside), drill pipe or casing (if no drill pipe is in hole). If successful, hydrostatic fluid pressure control will be established with respect to the over-pressurized zone. In the case of a blow-out, the surface or intermediate casing is often parted exposing the borehole to any proximate fresh water aquifers. Additionally, during kill operations, there is often a danger the casing will part before control is established. Furthermore, kill operations for blow-outs are not always successful and kill fluids can be blown from the well and sprayed across the countryside. Hence, any toxic chemicals included in the high density fluid could be transmitted through the aquifer, or directly through the blow-out, to the local animal and plant population.

A variety of drilling fluids and weighting agents are presently on the market. Generally, drilling fluids have an aqueous or hydrocarbon base. One principal requirement of a good drilling fluid is that it is able to suspend a sufficient amount of weighting additives so as to meet desired density requirements particularly with respect to preventing gasification and blow-outs, while remaining pumpable. With respect to aqueous base drilling fluids, a variety of water thickeners are also known. Examples are organic materials such as xanthan gums, aluminum containing compositions, such as hydrous aluminum oxide, polyacrylates, polyacrylamides and a variety of cellulose derivatives. Examples of known weighting materials include barite, hematite, calcium carbonate; zinc, potassium or sodium halides or phosphates and formates.

Under certain conditions conventional mud systems can be weighted up to thirty (30) pounds per gallon using galena as the weighting agent. Other carrier fluids such as zinc bromide and calcium bromide can also be used to carry galena. Lead powders have also been used to increase the density of zinc bromide carrier fluids. However, when wells are in communication with an aquifer the use of any metal or soluble material considered toxic is unacceptable. Additionally, the heavy carrier fluid would not be permitted to contain soluble, transmittable bromide and zinc.

With respect to blow-out control fluids, two desired qualities are good pumpability and a sufficiently high density to equilibrate downhole pressures. In blow-out situations environmental considerations receive additional attention since there is a greater likelihood of communication with an aquifer as well as the possibility of expulsion of fluids during blow-out. The density of fluid necessary for equilibration purposes is also dependent upon the well parameters.

Cement compositions, when utilized in oil field applications, must be readily pumpable and must have sufficiently high densities to equilibrate downhole pressures in the subterranean formation. When the formation is in communication with underground water, such as from an aquifer, the use of metals or water-soluble materials considered toxic is unacceptable. In addition, high density cement compositions find further application as buoy ballasts, ship ballasts, and grouting material.

In cementation of oil wells, a cement slurry is pumped down into a casing and back up the annular space between the outside of the casing and the wall of the well. The two most important purposes of the cementation process are to prevent transport of gas and liquid between subterranean formations and to tie up and support the casing pipe. In addition to sealing oil, -gas- and water producing formations, the cement also protects the casing against corrosion, prevents gas- or oil-blow-outs as the cement slurry seals the well quickly, protects the casing against shockloads and seals off formation having lost-circulation.

The setting time of the cement slurry must be adjusted to ensure that the cement slurry does not set before the slurry reaches the right location when pumped into the well. The setting time which is needed will among other things depend on the depth of cementation and on the temperature in the well.

The density of the cement slurry is important for cementing processes. For oil wells drilled through high pressure formations, cement slurries having a high density are used in order to avoid uncontrolled blow-outs. For oil wells which are drilled through low pressure formations where it is not advisable to expose the formations to high hydrostatic pressure, cement slurries having a low density have to be used, as a cement slurry having a too high density and thereby a high hydrostatic pressure may result in breakdown of the formation and loss of the cement slurry into the formation (lost circulation).

Another important property of the cement slurry is early strength. The early strength is critical for determining how quickly the drilling procedure can be restarted after the cementation process is completed. Cements which have a compressive strength after 24 hours of at least 1.5 MPa are usually satisfactory. The development of the early strength of the cement slurry is very dependent on the temperature in the well.

For cement slurries which are used for cementation of high temperature wells it is further important that the cement slurries do not lose their strength during time. It is known that at temperatures above about 110° C., ordinary Portland cement slurries over time will lose their strength as the normal binding phase, calcium hydroxide, is transformed to alpha-dicalcium silicate. This phenomenon is well known and is called cement strength retrogression.

High density cement slurries are produced by adding an inert high density filler material such as barite to an ordinary oil well cement slurry including Portland cement, water and additives for controlling the rheological properties of the cement slurry. The density range for so-called high density oil well cement slurries is from about 2.0 to 2.3 g/cm$^3$.

As set out above, high density cement slurries for oil well cements which are either gas tight or have a low tendency of strength retrogression at high temperatures are known. The primary disadvantage of the known high density cement slurries for cementing of oil wells, is that the high density filler material required affects the compressive strength of the cement and has a tendency to settle or sag as the temperature increases. The settling of the high density filler material will result in a variable density in the column of cement slurry with a higher density at the bottom of the column and a lower density at the top of the column. This difference in density can give the operators problems in controlling the pressure in the well and may in the worst case cause an uncontrolled blow-out.

In rotary drilling of wells, a drilling fluid is usually circulated down the drill string and back up the annulus between the drill string and the wellbore face. The drilling fluid can contain many different chemicals, but will most often contain a viscosifier, such as bentonite. When a casing string or liner is to be cemented into the wellbore, any drilling fluid and remnants of the viscosifier present in the wellbore are preferably removed to aid the bonding of the cement between the casing string or liner and the wellbore. In removing this drilling fluid from the wellbore and to clean the annulus, a wash or spacer fluid can be introduced ahead of a cement slurry.

Spacer fluids are conventionally used in cementing operations related to well completion in the following manner. Drilling fluids and cement slurries are typically chemically incompatible fluids which undergo severe gellation or flocculation if allowed to come into contact. Thus, drilling fluid must be removed from the wellbore annulus immediately prior to cement slurry placement. Spacer fluids are pumped between the drilling fluid and the cement slurry to form a buffer and prevent the drilling fluid and the cement slurry from coming into contact.

Spacer fluids should also possess certain rheological tendencies, such as turbulent flow at lower shear rates, which assist in granular solids removal and which encourage the removal of the drilling fluid filter cake from the walls of the well. Indeed, a common cause of failure in primary cementing is the incomplete displacement of drilling fluids which results in the development of mud filled channels in the cement. These mud filled channels may be opened during well production permitting the vertical migration of oil and gas behind the casing.

U.S. Pat. No. 4,584,327 disclosed high density fluids including water; a gelling agent selected from the group consisting of oxides of antimony, zinc oxide, barium oxide, barium sulfate, barium carbonate, iron oxide, hematite, other irons ores and mixtures thereof wherein said gelling agent has an average particle diameter size in the range of from about 0.5 to about 10.0 micrometers; hydraulic cement wherein said hydraulic cement has an average particle size in the range of from about 30 to about 200 micrometers wherein said hydraulic cement and said gelling agent have a physical makeup with regard to fine particle size, high density and intersurface attraction properties sufficient to create a slurry with said water that has a gel strength of at least 10 pounds per 100 square feet; and a weighting material selected from the group consisting of iron powder, hematite, other iron ores, steel shot, tungsten, tin, manganese, iron shot, and mixtures thereof wherein said weighting material has an average particle diameter size of from about 2 to about 20 times the average particle size of the gelling agent; said fluid having a density of from 24 pounds per gallon to about 40 pounds per gallon.

U.S. Pat. No. 4,935,060 disclosed hydraulic cement slurries include 5-85% microsilica based on the weight of cement; 5-250% of a high density filler material based on the weight of the cement, said high density filler material selected from the group consisting of barite, hematite and ilmenite, 0-5% of a retarder (dry weight) based on the weight of the cement, 0-12% of a thinner (dry weight) based on the weight of the cement, 0-8% of a fluid loss additive (dry weight) based on the weight of the cement, 0-30% of a silica material based on the weight of cement, said silica material selected from the group consisting of silica flour and silica sand, and water in such an amount that the cement slurry has a density between 1.95 and 2.40 g/cm$^3$.

U.S. Pat. No. 5,030,366 disclosed spacer compositions including sulfonated styrene-maleic anhydride copolymer, an ethoxylated nonylphenol surfactant, and water.

U.S. Pat. No. 5,789,352 disclosed spacer compositions including a hydrous magnesium silicate clay selected from the group consisting of sepiolite and attapulgite present in an amount in the range of from about 15% to about 85% by weight of said composition; silica present in an amount in the range of from about 15% to about 85% by weight of said composition; and an organic polymer selected from the group consisting of whelan gum, xanthan gum, galactomannan gums, succinoglycan gums, scleroglucan gums and cellulose and its derivatives present in an amount in the range of from about 0.5% to about 10% by weight of said composition.

U.S. Pat. No. 6,742,592 disclosed methods of cementing a zone of a well, comprising pumping into the well a cementing composition which comprises: (i) a hydraulic binder; (ii) a particulate material that has a specific gravity of greater than 3; and (iii) reinforcing particles which: comprise a flexible material; have a density of less than about 1.5 g/cm$^3$; have a Poisson ratio of more than 0.3; and have an average grain size of less than about 600 μm.

Thus, there is still a need in the art for environmentally compatible high density fluid composition which is suitable for use in subterranean drilling and blow-out control, or as a cement composition which is suitable for use in oil field applications or grouting applications, or as a ballast for ships or buoys.

SUMMARY OF THE INVENTION

Embodiments of the present invention provide drilling fluid compositions including an effective amount of a high density additive or a weighting system, where the amount is sufficient to impart a desired high bulk density to the compositions and where the system comprises a metal silicon alloy or a mixture thereof and where the system has a density of at least 5.0 g/cm³. In certain embodiments, the system has a density of a least 5.5 g/cm³. In certain embodiments, the system has a density of a least 6.0 g/cm³. In certain embodiments, the system has a density of a least 6.5 g/cm³. In certain embodiments, the system has a density of a least 7.0 g/cm³.

Embodiments of the present invention provide cement compositions for cementing subsurface wells including an effective amount of a high density additive or a weighting system, where the amount is sufficient to impart a desired high bulk density to the compositions and where the additive or system comprises a metal silicon alloy reagent or mixture thereof having a density of at least 5.0 g/cm³. In certain embodiments, the system has a density of a least 5.5 g/cm³. In certain embodiments, the system has a density of a least 6.0 g/cm³. In certain embodiments, the system has a density of a least 6.5 g/cm³. In certain embodiments, the system has a density of a least 7.0 g/cm³.

Embodiments of the present invention provide spacer fluid compositions including an effective amount of a high density additive or weighting system, where the amount is sufficient to impart a desired high bulk density to the compositions and where the additive or system comprises a metal silicon alloy reagent or mixture thereof having a density of at least at least 5.0 g/cm³. In certain embodiments, the system has a density of a least 5.5 g/cm³. In certain embodiments, the system has a density of a least 6.0 g/cm³. In certain embodiments, the system has a density of a least 6.5 g/cm³. In certain embodiments, the system has a density of a least 7.0 g/cm³.

Embodiments of the present invention provide dry mix compositions for forming the aqueous spacer fluids by mixing with water, where the compositions include an effective amount of a high density additive or weighting system, where the amount is sufficient to impart a desired high bulk density to the compositions and where the additive or system comprises a metal silicon alloy reagent or mixture thereof having a density of at least 5.0 g/cm³. In certain embodiments, the system has a density of a least 5.5 g/cm³. In certain embodiments, the system has a density of a least 6.0 g/cm³. In certain embodiments, the system has a density of a least 6.5 g/cm³. In certain embodiments, the system has a density of a least 7.0 g/cm³.

Embodiments of this invention provide methods for drilling subterranean including circulating a drilling fluid, while drilling a borehole, where the drilling fluid includes an effective amount of a weighting system comprising at least one metal silicon alloy in a bore hole, where the amount is effective to increase the column weight of the fluid to a desired pressure and where the drilling fluid has improved properties relative to a drilling fluid having a weight equivalent amount of a hematite weighting agent.

Embodiments of this invention provide methods for cementing subterranean including pumping a cementing composition including an effective amount of a weighting composition comprising at least one metal silicon alloy into a cased or uncased borehole, where the amount is effective to produce a cement having a relatively low plastic viscosity, a relatively low yield point, a relatively faster cure, a relatively higher cure strength after 6 hours of curing and relatively higher final cure strength relative to a cement composition having a weight equivalent of a hematite weighting agent.

Embodiments of this invention provide methods including displacing a first fluid such as a drilling fluid, with an incompatible second fluid such as a cement slurry, in a well. The spacer fluid functions to separate the first fluid from the second fluid and to remove the first fluid from the walls of the well, where the spacer fluid includes an effective amount of a weighting system of this invention. In drilling and completion operations, the purpose of the spacer fluid is to suspend and remove partially dehydrated/gelled drilling fluid and drill cuttings from the well bore and allow a second fluid such as completion brines, to be placed in the well bore.

BRIEF DESCRIPTION OF THE DRAWINGS

The invention can be better understood with reference to the following detailed description together with the appended illustrative drawings in which like elements are numbered the same.

DEFINITIONS OF TERM USED IN THE INVENTION

Figure 1:
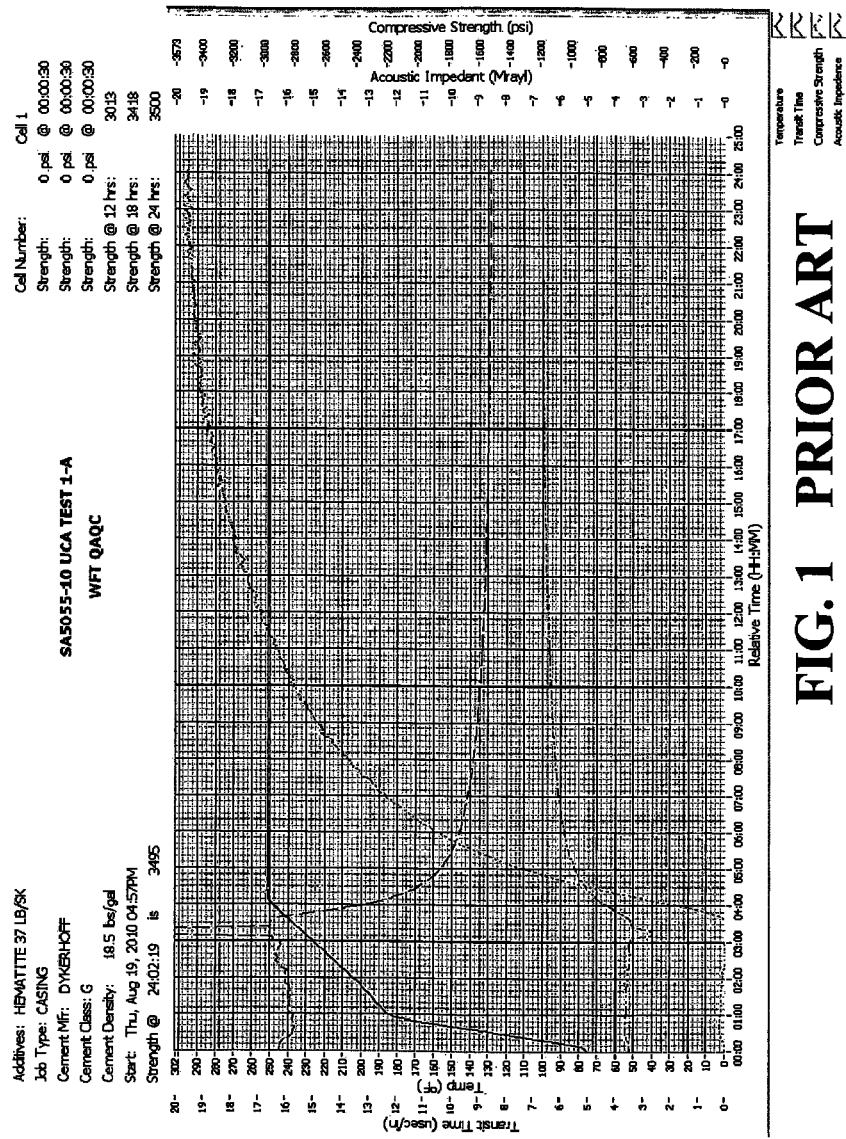
FIG. 1 depicts UCA test of a prior art cementing composition including 18.5 lbs/gal of hematite prepared by adding 37 lb/sk of hematite to the fluid.

The following definitions are provided in order to aid those skilled in the art in understanding the detailed description of the present invention.

The term "surfactant" refers to a soluble, or partially soluble compound that reduces the surface tension of liquids, or reduces interfacial tension between two liquids, or a liquid and a solid by congregating and orienting itself at these interfaces.

The term "drilling fluids" refers to any fluid that is used during well drilling operations including oil and/or gas wells, geo-thermal wells, water wells or other similar wells.

The term "completion fluids" refers to any fluid that is used in oil and/or gas well completion operations.

The term "production fluids" refers to any fluid that is used in oil and/or gas well production operations.

The term "cementing composition" means a composition used to cement or complete a subterranean well.

The term "hydraulic cement" means a cementing composition that setups to a hard monolithic mass under water. Generally, any hydraulic cement may be used in the present invention. In certain embodiments, Portland cement may be used because of its low cost, availability, and general utility. In other embodiments, Portland cements of API Classes A, B, C, H, and/or G may be used in the invention. In other embodiments, other API Classes of cements, such as calcium aluminate and gypsum cement, may be used. In addition, mixtures or combinations of these cement components can be used. The characteristics of these cements are described in API Specification For Materials and Testing for Well Cements, API Spec 10 A, First Edition, January 1982, which is hereby incorporated by reference.

The term "spacer fluid or preflushing medium" means a fluid used to isolate fluids or to purge one fluid so that it can be replaced by a second fluid.

An over-balanced drilling fluid means a drilling fluid having a circulating hydrostatic density (pressure) that is greater than the formation density (pressure).

An under-balanced and/or managed pressure drilling fluid means a drilling fluid having a circulating hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additives may be included such as corrosion inhibitors, pH modifiers and/or a shale inhibitors.

The term "foamable" means a composition that when mixed with a gas forms a stable foam.

The term "gpt" means gallons per thousand gallons.

The term "ppt" means pounds per thousand gallons.

DETAILED DESCRIPTION OF THE INVENTION

The inventors have found that drilling fluid, spacer fluid and cementing compositions for downhole drilling and cementing applications can be formulated using a safe, economical and environmentally friendly material having a specific gravity greater than or equal to about 6.0 to make high density drilling fluid, spacer fluid and cementing compositions. The inventors have found that certain metal silicon alloys having specific gravities greater than or equal to about 6.0 provide drilling fluid, spacer fluid or cementing compositions that are densified with less material, while not diminishing or adversely affecting other fluid properties. In certain embodiments, the inventors have found that particulate metal silicon alloy having a specific gravity of about 7.0 provide drilling fluid, spacer fluid or cementing compositions that are densified with less material, while not diminishing or adversely affecting other fluid properties. The less material required for density allows for optimum design of rhelogical and mechanical properties of the specific fluids.

Drilling Fluids

Generally, a drilling fluid is used during the drilling of a well. Drilling fluids may be designed for so-called over-balanced drilling (a hydrostatic pressure of the drilling fluid column is higher than the pore pressure of the formation), under-balanced drilling (a hydrostatic pressure of the drilling fluid column is lower than the pore pressure of the formation) or managed pressure drilling, where the hydrostatic pressure of the drilling fluid is managed depending on the nature of the material through which drilling is occurring. Each type of drilling uses different types of drilling fluids. The compositions of this invention are designed to produce high density drilling fluids for use in over-balanced drilling and fluids to kill a well in the event of a problem with production or completion.

Embodiments of the present invention relates to drilling fluid compositions including an effective amount of a high density additive, where the amount is sufficient to impart a desired high bulk density to the compositions and where the additive is a metal silicon alloy reagent or a mixture thereof having a density of at least 6.0 g/cm$^3$.

Compositional Ranges

In certain embodiments, the composition includes an effective amount of a high density additive, where the amount is sufficient to impart a desired high bulk density to the compositions and where the additive is a metal silicon alloy reagent or a mixture thereof having a density of at least 6.0 g/cm$^3$. In other embodiments, the effective amount is dependent on the overall density, rheological, and mechanical properties of the fluid required.

Suitable Reagents

Densifying or Weighting Reagents for Use in the Invention

Suitable metal silicon alloys for use in the composition of this invention including, without limitation, ferrosilicon, Perryite, ferromanganese, ferromanganese silicon, other metal silicon alloys or mixtures of combinations thereof. Other densifying or weighting reagents or agents include, without limitation, iron, steel, barite, hematite, other iron ores, tungsten, tin, manganese, manganese tetraoxide, calcium carbonate, illmenite, sand or mixtures thereof. The metal silicon alloys and the other densifying or weighting reagents may be in the form of nano-particles, micro-particles, powders (mixture of particles sizes), shot, granular, or mixtures and combinations thereof. The powders include particles having an average particle diameter size between about 10 nm and about 1 mm. In other embodiments, the powder comprises particles having an average particle diameter size between about 100 nm and about 500 μm. In other embodiments, the powder comprises particles having an average particle diameter size between about 500 nm and about 500 μm.

Suitable Drilling Fluid Components for Aqueous Based Fluids

Suitable aqueous base fluids for use in this invention includes, without limitation, Seawater, freshwater, saline water or such makeup system containing up to about 30% crude oil.

Suitable Drilling Fluid Components for Oil Based Fluids

Suitable oil based fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5\times10^{-6}$ to about $600\times10^{-6}$ m$^2$/s (5 to about 600 centistokes). Exemplary examples of such hydrocarbon fluids include, without limitation, polyalphaolefins, polybutenes, polyolesters, vegetable oils, animal oils, other essential oil, diesel having a low or high sulfur content, kerosene, jet-fuel, internal olefins (IO) having between about 12 and 20 carbon atoms, linear alpha olefins having between about 14 and 20 carbon atoms, polyalphaolefins having between about 12 and about 20 carbon atoms, isomerized alpha olefins (IAO) having between about 12 and about 20 carbon atoms, VM&P Naptha, Limpar, Linear paraffins, detergent alkylates and Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include blends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythriols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5\times10^{-6}$ to about $600\times10^{-6}$ m$^2$/s (5 to about 600 centistokes) at 40°C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell Chemical Company, and naphthenic oils sold under the names HydroCal and Calsol by Calumet.

Exemplary examples of vegetable oils include, without limitation, castor oils, corn oil, olive oil, sunflower oil, sesame oil, peanut oil, other vegetable oils, modified vegetable oils such as cross linked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Suitable foaming agents for use in this invention include, without limitation, any foaming agent suitable for foaming hydrocarbon based drilling fluids. Exemplary examples of foaming agents include, without limitation, silicone foaming agents such as tetra(trimethylsiloxy)silane, fluorinated oligomeric or polymeric foams such as fluorinated methacrylic copolymer, or other similar foaming agents capable of producing a foam in a hydrocarbon or oil-based drilling fluid or mixtures or combinations thereof. Exemplary examples of such foaming agents include, without limitation, DC-1250 available from Dow Corning, Zonyl FSG available from DuPont, APFS-16 available from Applied Polymer, A4851 available from Baker Petrolite, Superfoam available from Oilfield Solutions, Paratene HFA available from Woodrising, DVF-880 available from Parasol Chemicals INC., JBR200, JBR300, JBR400, and JBR500 available from Jeneil Biosurfactant Company, Paratene HFA, Paratene HFB, Paratene MFA, Paratene MFB available from Woodrising Resources Ltd. or mixture or combinations.

Suitable polymers for use in this invention include, without limitation, any polymer soluble in the oil based fluid. Exemplary polymers include, without limitation, a polymer comprising units of one or more (one, two, three, four, five, . . . , as many as desired) polymerizable mono-olefins or di-olefins. Exemplary examples includes, without limitation, polyethylene, polypropylene, polybutylene, or other poly-alpha-olefins, polystyrene or other polyaromatic olefins, polybutadiene, polyisoprene, or other poly-diolefins, or copolymers (a polymer including two or more mono-olefins or di-olefins) or copolymers including minor amount of other co-polymerizable monomers such as acrylates (acrylic acid, methyl acrylate, ethyl acrylate, etc.), methacrylates (methacrylic acid, methyl methacrylate, ethyl methacrylate, etc), vinylacetate, maleic anhydride, succinic anhydride, or the like, provided of course that the resulting polymer is soluble in the hydrocarbon base fluid.

Suitable gelling agents for use in this invention include, without limitation, any gelling agent. Exemplary gelling agents includes phosphate esters, ethylene-acrylic acid copolymer, ethylene-methacrylic acid copolymers, ethylene-vinyl acetate copolymers, ethylene-maleic anhydride copolymers, butadiene-methacrylic acid copolymers, ethylene-methacrylic acid copolymers, styrene-butadiene-acrylic acid copolymers, styrene-butadiene-methacrylic acid copolymers, or other copolymer including monomers having acid moieties or mixtures or combinations thereof. Exemplary examples phosphate ester gelling agents include, without limitation, WEC HGA 37, WEC HGA 70, WEC HGA 71, WEC HGA 72, WEC HGA 702 or mixtures or combinations thereof, available from Weatherford International. Other suitable gelling agents include, without limitation, WEEL-VIS II available from Weatherford, Ken-Gel available from Imco or the like.

Suitable cross-linking agent for use in this invention include, without limitation, any suitable cross-linking agent for use with the gelling agents. Exemplary cross-linking agents include, without limitation, di- and tri-valent metal salts such as calcium salts, magnesium salts, barium salts, copperous salts, cupric salts, ferric salts, aluminum salts, or mixtures or combinations thereof. Exemplary examples cross-linking agent for use with phosphate esters include, without limitation, WEC HGA 44, WEC HGA 48, WEC HGA 55se, WEC HGA 55s, WEC HGA 61, WEC HGA 65 or mixtures or combinations thereof available from Weatherford International.

Suitable defoaming agents for use in this invention include, without limitation, any defoaming agent capable of reducing the foam height of the foamed drilling fluid systems of this invention. Exemplary examples of defoaming agents are low molecular weight alcohols with isopropanol or isopropyl alcohol (IPA) being preferred.

Gases

Suitable gases for foaming the foamable, ionically coupled gel composition include, without limitation, nitrogen, carbon dioxide, or any other gas suitable for use in formation fracturing, or mixtures or combinations thereof.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: $C_1$ to $C_8$ monocarboxylic acids such as formic acid, acetic acid, propanoic acid, butanoic acid, pentanoic acid, hexanoic acid, heptanoic acid, octanoic acid, 2-ethylhexanoic acid, or the like; $C_2$ to $C_{12}$ dicarboxylic acids, $C_2$ to $C_{12}$ unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., $Na^+$, $K^+$ or $NH^+$ salts of EDTA; $Na^+$, $K^+$ or $NH^+$ salts of NTA; $Na^+$, $K^+$ or $NH^+$ salts of Erythorbic acid; $Na^+$, $K^+$ or $NH^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; Na, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythrol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™ Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils, soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For a system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to produce sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus-Nitrilotriacetamide available from Clearwater International, LLC of Houston, Tex.

Cement or Cementing Compositions

The high density cement compositions of this invention are generally slurries including water, an optional gelling system, and hydraulic cement system, where the hydraulic cement system includes a weighting or densifying subsystem including at least one metal silicon alloy having a density of at least 6.0 g/cm$^3$.

The fluid compositions of this invention are particularly well suited as high density drilling fluids and drilling muds. In certain embodiments, the compositions may also include loss control additives such as bentonite, cellulose derivatives, polyacrylamides, polyacrylates or the like, while also possessing utility as blow-out control fluids. In other embodiments, the compositions of this invention are particularly well suited as high density kill fluids, where environmental compatibility is of concern.

In other embodiments, a viscosity of the compositions of this invention may be controlled using commercially available viscosifiers and dispersants, with such addition occurring either before addition of the optional gelling agent if present or simply added to the fluid when a powdered material is being incorporated. The variety and amount of the dispersants, viscosifiers, gelling agent and weighting system used will be dictated by the well parameters.

Dispersants and viscosifiers may be added to provide additional rheology control. An example of common a dispersant chemistry is naptoline sulfonates Dispersant, An example of an acceptable viscosifier is HEC, hydroxethly cellulose, Viscosifier. Generally, a dispersant may be added to reduce friction so that turbulent flow can be achieved at lower pumping rates, as well as to reduce fluid loss. In general, it is easier to over thin the fluid in question with the dispersant and thereafter use a small amount of viscosifier to elevate the viscosity to a desired level.

In certain embodiments, it has been found that powdered metal silicon alloys form a high density suspensions or slurries for use as drilling fluids, drilling muds and blow-out control fluids. The metal silicon alloy weighting agents are environmentally friendly, while not adversely affecting other properties of the fluid.

In utilizing the cementing compositions for sealing a subterranean formation, a specific quantity of cement slurry is prepared and introduced through the well bore into the formation to be treated. The cement slurry is particularly useful in cementing the annular void space (annulus) between a casing or pipe in the borehole. The cement slurry is easily pumped downwardly through the pipe and then outward and upwardly into the annular space on the outside of the pipe. Upon solidifying, the cement slurry sets into a high strength, high density, concrete form or structure.

When the cement slurry is utilized in a high temperature environment, such as deep oil wells, set time retarders may be utilized in the cement composition in order to provide ample fluid time for placement of the composition at the point of application.

A particularly desirable use of the high density cement compositions of this invention is in oil field applications, where borehole conditions of a well limit the interval in which high density cement may be used for the purpose of controlling a pressurized formation. An example of such a use would be when a weak formation is separated from an over-pressured formation by relatively short intervals.

Embodiments of the hydraulic cement compositions of this invention include from about 25 wt. % to about 110 wt. % of the high density filler material, based on the weight of the cement in the absence of the high density filler material. The high density filler materials of this invention include metal silicon alloys or mixtures thereof.

Embodiments of hydraulic cement compositions of this invention may also include a retarder in the amount of 0.1-3% (dry weight) based on the weight of cement. The chemical composition of retarders are known in the art. They may be based on lignosulfonates, modified lignosulfonates, polyhydroxy carboxylic acids, carbohydrates, cellulose derivatives or borates. Some of the retarders will also act as thinners in the hydraulic cement slurry and when such retarders are used the dosage of thinners may be reduced.

Embodiments of hydraulic cement compositions of this invention may also include a thinner or dispersant in an amount of 0.7 to 6% (dry weight) based on the weight of the cement. Thinners additives which are known as plastisizers or superplastisizers in cement based systems can be used. These are well-known additives which may be based on lignosulfonate, sulfonated napthaleneformaldehyde or sulfonated melamineformaldehyde products.

Embodiments of hydraulic cement compositions of this invention may also include 0.1-4% (dry weight) of a fluid loss additive based on the weight of the cement. Known fluid loss additives may be based on starch or derivates of starch, derivates of cellulose such as carboxymethylcellulose, methylcellulose or ethylcellulose or synthetic polymers such as polyacrylonitrile or polyacrylamide may be used.

Cement slurries which are used at high well temperature may also include 10-35% silica flour and/or silica sand based on the weight of the cement.

Both fresh water and sea water may be used in the hydraulic cement slurry of the present invention.

If necessary, accelerators may be incorporated into the cement slurry in order to adjust the setting time.

It has surprisingly been found that the high density hydraulic cement compositions of the present invention are gas tight, show very little tendency of settling and have low strength retrogression. Thus the content of high density filler material and the content of silica sand or silica flour may be increased above the conventional levels without affecting the plasticity of the cement slurries while the tendency of settling is strongly reduced.

In certain embodiments, the high density cement compositions of this invention have a density of about 21 lbs/gallon.

In certain embodiments, the high density cement compositions of this invention may include a second weighting material in addition to the primary weighting material comprising a metal silicon alloy or mixtures of metal silicon alloys, where the second weighting material including iron, steel, barite, hematite, other iron ores, tungsten, tin, manganese, manganese tetraoxide, calcium carbonate, illmenite, sand or mixtures thereof. The relative amount and type of the two weighting materials may be selected to produce desired properties of the cementing composition.

Methods of Cementing

The overall process of cementing an annular space in a wellbore typically includes the displacement of drilling fluid with a spacer fluid or preflushing medium which will further assure the displacement or removal of the drilling fluid and enhance the bonding of the cement to adjacent structures. For example, it is contemplated that drilling fluid may be displaced from a wellbore, by first pumping into the wellbore a spacer fluid according to the present invention for displacing the drilling fluid which in turn is displaced by a cement composition or by a drilling fluid which has been converted to cement, for instance, in accordance with the methods disclosed in U.S. Pat. No. 4,883,125, the entire disclosure is incorporated by reference due to the action of the last paragraph of the specification.

In other embodiments, the spacer compositions of this invention (1) provide a buffer zone between the drilling fluid being displaced and the conventional cement slurry following the spacer fluid, (2) enhance the bonding between the conventional cement slurry and the surfaces of the borehole and casing, and (3) set to provide casing support and corrosion protection.

In other embodiments of the present invention, the spacer fluid may comprise, in combination, water, styrene-maleic anhydride copolymers (SMA) as a dispersant with or without anionic and/or nonionic water wetting surfactants, and with or without viscosifying materials such as HEC (hydroxymethyl cellulose), CMHEC (carboxymethylhydroxyethyl cellulose), PHPA (partially hydrolyzed polyacrylamide), bentonite, attapulgite, sepiolite and sodium silicate and weighting system including at least one metal silicon alloys to form a rheologically compatible medium for displacing drilling fluid from the wellbore.

In other embodiment a of the present invention, the spacer fluid comprises SMA, bentonite, welan gum, surfactant and a weighting agent. Preferably, the spacer fluid according to the fourth embodiment of the present invention comprises a spacer dry mix which includes: 1) 10 wt. % to 50 wt. % by weight of SMA as a dispersant; 2) 40 wt. % to 90 wt. % by weight of bentonite as a suspending agent; 3) 1 wt. % to 20 wt. % welan gum as a pseudoplastic, high efficiency viscosifier tolerant to salt and calcium, available from Kelco, Inc. under the trade name BIOZAN™; 4) 0.01 gal per bbl to 10.0 gal per bbl of aqueous base spacer of an ethoxylated nonylphenol surfactant having a mole ratio of ethylene oxide to nonylphenol ranging from 1.5 to 15, available from GAF under the trade name IGEPAL; 5) 20 wt. % to 110 wt. % of a weighting system including at least one metal silicon alloy having a density greater than or equal to about 6.0 g/cm$^3$. In certain embodiments, the weighting agent will be added to the spacer fluid in an amount to give the spacer fluid a density equal to or greater than the density of the drilling fluid and less than or equal to the density of the cement slurry.

In well cementing operations such as primary cementing, a cement slurry is pumped into the annulus between a string of casing disposed in the well bore and the walls of the well bore for the intended purpose of sealing the annulus to the flow of fluids through the well bore, supporting the casing and protecting the casing from corrosive elements in the well bore. The drilling fluid present in the annulus partially dehydrates and gels as it loses filtrate to the formation. The presence of this partially dehydrated/gelled drilling fluid in the annulus is detrimental to obtaining an adequate cement bond between the casing and the well bore. As the casing becomes more eccentric, the removal process becomes more difficult.

In order to separate the cement slurry from the drilling fluid and remove partially dehydrated/gelled drilling fluid from the walls of the well bore ahead of the cement slurry as it is pumped, a spacer fluid is inserted between the drilling fluid and the cement slurry. The spacer fluid prevents contact between the cement slurry and drilling fluid and it is intended to possess rheological properties which bring about the removal of partially dehydrated/gelled drilling fluid from the well bore. However, virtually all elements of the downhole environment work against this end. Fluid loss from the drilling fluid produces localized pockets of high viscosity fluid. At any given shear rate (short of turbulent flow) the less viscous spacer fluid will tend to channel or finger through the more viscous drilling fluid. At low shear rates, the apparent viscosity of most cement and spacer fluids is lower than that of the high viscosity drilling fluid in localized pockets. To overcome this, the cement and spacer fluids are pumped at higher rates so that the fluids are at higher shear rates and generally have greater apparent viscosities than the drilling fluid. Drag forces produced by the drilling fluid upon filter cake are also increased. Unfortunately, the pump rates that are practical or available are not always sufficient to effectively displace and remove drilling fluid from the well bore prior to primary cementing.

Displacement of the drilling fluid is hindered by the fact that the pipe is generally poorly centered causing an eccentric annulus. In an eccentric annulus, the displacing spacer fluid tends to take the path of least resistance. It travels or channels through the wide side of the eccentric annulus where the overall shear level is lower. Since the cement and spacer fluid travel faster up the wide side of the annulus, complete cement coverage may not result before completion of the pumping of a fixed volume. Also, since the flow path will generally spiral around the pipe, drilling fluid pockets are often formed.

The displacement of drilling fluid from well bore washouts is also a problem. When the velocity (shear rate) and relative shear stress of the cement and spacer fluid are lowered due to encountering an enlarged well bore section, it is difficult for the spacer fluid to displace the drilling fluid. The cross-sectional area in enlarged sections of a well bore can be several orders of magnitude greater than the predominate or designed annulus. Fluid flow through those sections is at much lower shear rates and generally the annulus is also more eccentric since the well bore diameter is often outside the maximum effective range of casing centralizers.

Another problem which adversely affects drilling fluid displacement is spacer fluid thermal thinning. A high degree of thermal thinning normally limits available down hole viscosity, particularly at elevated temperatures and low shear rates. In that situation, adequate viscosity at the lower shear rates can often not be obtained because the spacer fluid at the surface would be too viscous to be mixed or pumped. Even a very viscous spacer fluid exhibits relatively little viscosity at low shear rates and elevated temperatures.

Typically, one or more of the above mentioned rheological or other factors are working against efficient drilling fluid displacement. As a result, pockets of non-displaced drilling fluid are generally left within the annulus at the end of displacement. As mentioned, high displacement rates would help many of these problems, but in most field applications pump capacity and formation fracture gradients limit the displacement rates to less than those required. Even when relatively high pump rates can be utilized, cement evaluation logs typically show a good cement sheath only in areas of good centralization and normal well bore diameter.

Another problem involves the lack of solids suspension by spacer fluids. The thermal thinning and reduced low shear rate viscosity exhibited by many spacer fluids promotes sedimentation of solids. Until a spacer fluid develops enough static gel strength to support solids, control of sedimentation is primarily a function of low shear rate viscosity. In deviated or horizontal well bores, solids support is much more difficult and at the same time more critical. The more nearly horizontal the well bore is, the shorter the distance for coalescence. As a result, high density solids can quickly build-up on the bottom of the well bore.

An ideal spacer fluid would have a flat rheology, i.e., a 300/3 ratio approaching 1. It would exhibit the same resistance to flow across a broad range of shear rates and limit thermal thinning, particularly at low shear rates. A 300/3 ratio is defined as the 300 rpm shear stress divided by the 3 rpm shear stress measured on a Chandler or Fann Model 35 rotational viscometer using a B1 bob, an R1 sleeve and a No. 1 spring. The greater the resultant slope value, the more prone the spacer fluid is to channeling in an eccentric annulus; 300/3 ratios of 2 to 6 are achieved by the spacer fluid compositions of this invention. As a result, the compositions are better suited for drilling fluid displacement than prior art spacer fluids. The spacer fluids of this invention have relatively flat rheologies and are not impacted by eccentric annuli since they exhibit nearly the same resistance to flow across the whole annulus. Most prior art spacers exhibit a 300/3 ratio of 8-10.

By the present invention, improved spacer fluids are provided which have excellent compatibility with treating fluids such as cement slurries, drilling fluids and other completion fluids. The spacer fluids also possess the ability to suspend and transport solid materials such as partially dehydrated/gelled drilling fluid and filter cake solids from the well bore. Further, the relatively flat rheology spacer fluids of this invention possess the ability to maintain nearly uniform fluid velocity profiles across the well bore annulus as the spacer fluids are pumped through the annulus, i.e., the spacer fluids are pseudo-plastic with a near constant shear stress profile.

A dry mix composition of this invention for forming an aqueous, high density spacer fluid comprises a hydrous magnesium silicate clay, silica, an organic polymer and a weighting system including at least one metal silicon alloy having a density of at least 6.0. The hydrous magnesium silicate clay may include sepiolite and/or attapulgite.

Various forms of silica may be used such as fumed silica and colloidal silica. Fumed silica is preferred for use in the dry mix composition of this invention. As will be described further, colloidal silica is preferably used in the spacer compositions which are prepared by directly mixing the individual components with water.

The organic polymer may be welan gum, xanthan gum, galactomannan gums, succinoglycan gums, scleroglucan gums, cellulose and its derivatives, e.g., HEC, or mixtures and combinations thereof.

The dry mix compositions and/or the aqueous spacer fluids may also include a dispersing agent, a surfactant, and a weighting material. The dispersant improves compatibility of fluids which would otherwise be incompatible. The surfactant improves bonding and both the dispersant and surfactant aid in the removal of partially dehydrated/gelled drilling fluid. The weighting material increases the density of the spacer fluid.

Various dispersing agents can be utilized in the compositions of this invention. However, preferred dispersing agents are those selected from the group consisting of sulfonated styrene maleic anhydride copolymer, sulfonated vinyl-toluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers. Generally, the dispersing agent is included in the dry mix composition in an amount in the range of from about 0.5% to about 50% by weight of the composition. It is included in the aqueous spacer fluid in an amount in the range of from about 0.05% to about 3% by weight of water in the aqueous spacer fluid composition (from about 0.1 pounds to about 10 pounds per barrel of spacer fluid). The dispersant can be added directly to the water if in liquid or solid form or included in the dry mix composition if in solid form.

While various water-wetting surfactants can be used in the compositions, nonylphenol ethoxylates, alcohol ethoxylates and sugar lipids are generally preferred. When used, the surfactant is included in the spacer fluid in an amount which replaces up to about 20% of the water used, i.e., an amount in the range of from about 0.1 gallon to about 10 gallons per barrel of spacer fluid when the surfactant is in the form of a 50% by weight aqueous concentrate. The surfactant is normally added directly to the water used or to the aqueous spacer fluid.

The weighting system includes at least one metal silicon alloy having a density greater than or equal to 6.0 g/cm$^3$. In certain embodiments, the metal silicon alloy is a ferrosilicon having a density greater than or equal to 6.0 g/cm$^3$. The amount of weighting system added to the aqueous spacer fluid is that amount which produces a spacer fluid density in the range of from about 9 pounds per gallon to about 24 pounds per gallon or higher depending on needs.

Other components can advantageously be included in the spacer fluids of this invention in relatively small quantities such as salts, e.g., ammonium chloride, sodium chloride and potassium chloride.

As mentioned, the spacer fluids of this invention are pseudo-plastic fluids with near constant shear stress profiles, i.e., 300/3 ratios of from about 2 to about 6. This property of the spacer fluids of this invention is particularly important when the spacer fluids are utilized in primary cementing operations. The property allows the spacer fluids to maintain nearly uniform fluid velocity profiles across a well bore annulus as the spacer fluids followed by cement slurries are pumped into the annulus. The nearly uniform fluid velocity profile brings about a more even distribution of hydraulic force impinging on the walls of the well bore thereby enhancing the removal of partially dehydrated/gelled drilling fluid and solids from the well bore. This property of the spacer fluid is particularly important in applications where the casing being cemented is located eccentrically in the well bore (an extremely probable condition for highly deviated well bores).

In carrying out the methods of the present invention, a first fluid is displaced with an incompatible second fluid in a well bore utilizing a spacer fluid of the invention to separate the first fluid from the second fluid and to remove the first fluid from the well bore. In primary cementing applications, the spacer fluid is generally introduced into the casing or other pipe to be cemented between drilling fluid in the casing and a cement slurry. The cement slurry is pumped down the casing whereby the spacer fluid ahead of the cement slurry displaces drilling fluid from the interior of the casing and from the annulus between the exterior of the casing and the walls of the well bore. The spacer fluid prevents the cement slurry from contacting the drilling fluid and thereby prevents severe viscosification or flocculation which can completely plug the casing or the annulus. As the spacer fluid is pumped through the annulus, it aggressively removes partially dehydrated/gelled drilling fluid and filter cake solids from the well bore and maintains the removed materials in suspension whereby they are removed from the annulus. As mentioned above, in primary cementing applications, the spacer fluid preferably includes a surfactant whereby the surfaces within the annulus are water-wetted and the cement achieves a good bond to the surfaces.

The cement composition of this invention may also include hydraulic binders and reinforcing particles. The flexible particles include materials having a Young's modulus of less than 5000 mega Pascals (Mpa). In certain embodiments, the flexible particles have a Young's modulus of less than 3000 Mpa, while in other embodiments, the flexible particles have a Young's modulus of less than 2000 Mpa. In certain embodiments, the elasticity of these particles is at least four times greater than that of cement and more than thirteen times that of the silica usually used as an additive in oil well cements. In certain embodiments, the flexible particles are added to the cementing compositions of the invention have low compressibility. In certain embodiments, the materials are more compressible than rubbers, in particular with a Poisson ratio of less than 0.45. In other embodiments, the Poisson ratio is less than 0.4. However, materials which are too compressible, with a Poisson ratio of less than 0.3 may result in inferior behavior.

The reinforcing particles are generally insoluble in an aqueous medium which may be saline, and they must be capable of resisting a hot basic medium since the pH of a cementing slurry is generally close to 13 and the temperature in a well is routinely higher than 100°C.

In certain embodiments, the flexible particles are isotropic in shape. Spherical or near spherical particles may be synthesized directly, but usually the particles are obtained by grinding such as by cryo-grinding. The average particle size ranges from about 80 μm to about 600 μm. In other embodiments, the average particle size ranges from about 100 μm to about 500 μm. Particles which are too fine, also particles which are too coarse, are difficult to incorporate into the mixture or result in pasty slurries which are unsuitable for use in an oil well.

Particular examples of materials which satisfy the various criteria cited above are thermoplastics (polyamide, polypropylene, polyethylene, . . . ) or other polymers such as styrene divinylbenzene or styrene butadiene (SBR).

In addition to flexible particles and weighting agents of this invention, the cementing compositions of the invention comprise an hydraulic binder, in general based on Portland cement and water. Depending on the specifications regarding the conditions for use, the cementing compositions can also be optimized by adding additives which are common to the majority of cementing compositions, such as suspension agents, dispersing agents, anti-foaming agents, expansion agents (for example magnesium oxide or a mixture of magnesium and calcium oxides), line particles, fluid loss control agents, gas migration control agents, retarders or setting accelerators.

A typical composition of the invention comprise, by volume, 2% to 15% of a weighting composition of this invention, 5% to 20% of flexible particles, 20% to 45% of cement and 40% to 50% of mixing water.

The formulations of the invention may be based on Portland cements including classes A, B, C, G, H and/or R as defined in Section 10 of the American Petroleum Institute's (API) standards. In certain embodiments, the Portland cements includes classes G and/or H, but other cements which are known in this art can also be used to advantage. For low-temperature applications, aluminous cements and Portland/plaster mixtures (for deepwater wells, for example) or cement/silica mixtures (for wells where the temperature exceeds 120°C., for example) may be used, or cements obtained by mixing a Portland cement, slurry cements and/or fly ash.

The water used to constitute the slurry is preferably water with a low mineral content such as tap water. Other types of water, such as seawater, can possibly be used but this is generally not preferable.

These particles with low density with respect to the cement can affect the flexibility of the system, since adding flexible particles produces cements with a lower Young's modulus, while producing low permeability and better impact resistance.

The mechanical properties of the compositions comprising flexible particles of the invention are remarkable, rendering them particularly suitable for cementing in areas of an oil well which are subjected to extreme stresses, such as perforation zones, junctions for branches of a lateral well or plug formation.

EXPERIMENTS OF THE INVENTION

Prior Art Cement Formulation

This example illustrates the preparation of a prior art cement formulation having a density of 18.5 lbs/gal using hematite as a conventional weighting agent.

The prior art cement formulation was formulated as shown in Table I by mixing the indicated reagents together.

TABLE I

Prior Art Cement Formulation

| Material Function | Material Description | Conc. (lb/gal) | Prod Weight (lbs/sk) |
|---|---|---|---|
| Weighting Agent | Silica Sand | 35.000 | 32.900 |
| Weighting Agent | Hematite | 37.000 | 37.000 |
| Fluid Loss | CFL-160 | 0.800 | 0.752 |
| Retarder | CR-225 | 0.500 | 0.470 |
| Defoamer | Clear Air 2325 | 0.020 | 0.153 |

Comparative example had the rheological properties shown in Table II.

TABLE II

Rheological Properties of Prior Art Cement Formulation

| Fluid/Mixture | T (° F.) | 300 | 200 | 100 | 60 | 30 | 6 | 3 | PV$^a$ | YP$^b$ |
|---|---|---|---|---|---|---|---|---|---|---|
| Cement | 80 up | 420 | 324 | 204 | 144 | 90 | 33.2 | 25.2 | 362 | 75 |
| 100% | 80 dwn | 420 | 308 | 182 | 124 | 74 | 26.2 | 18.4 | 381 | 50 |
| Cement | 80 avg | 420 | 316 | 192 | 134 | 82 | 29.6 | 22 | 372 | 62 |
| 100% | 180 up | 258 | 198 | 122 | 88 | 56 | 19.6 | 13 | 222 | 45 |
| Cement | 180 dwn | 258 | 192 | 114 | 74 | 46 | 16 | 11.2 | 235 | 31 |
| 100% | 180 avg | 258 | 196 | 118 | 82 | 52 | 17.8 | 12 | 228 | 39 |
|  |  |  |  |  |  |  |  |  | cP | lb$_f$/100 ft$^2$ |

$^a$PV: Plastic Viscosity;
$^b$YP: Yield Point

The prior art cement formulation yielded the compressive strength chart shown in FIG. 1.

Embodiment of a Cement Formulation of this Invention

This example illustrates the preparation of an embodiment of a cement formulation of this invention having a density of 18.5 lbs/gal using ferrosilicon as the weighting agent.

The embodiment of a cement formulation of this invention was formulated as shown in Table III by mixing the indicated reagents together.

TABLE III

Embodiment of a Cement Formulation of This Invention

| Material Function | Material Description | Conc. (lb/gal) | Prod Weight (lbs/sk) |
|---|---|---|---|
| Weighting Agent | Silica Sand | 35.000 | 32.900 |
| Weighting Agent | Ferro Silicon Powder | 27.000 | 27.000 |
| Fluid Loss | CFL-160 | 0.800 | 0.752 |
| Retarder | CR-225 | 0.500 | 0.470 |
| Defoamer | Clear Air 2325 | 0.020 | 0.153 |

The embodiment of a cement formulation of this invention had the rheological properties shown in Table IV.

TABLE IV

Rheological Properties of the Embodiment of a Cement Formulation of This Invention

| Fluid/Mixture | T (° F.) | 300 | 200 | 100 | 60 | 30 | 6 | 3 | PV$^a$ | YP$^b$ |
|---|---|---|---|---|---|---|---|---|---|---|
| Cement | 80 up | 310 | 234 | 142 | 98 | 60 | 22.4 | 16.6 | 275 | 45 |
| 100% | 80 dwn | 310 | 234 | 138 | 92 | 56 | 18.2 | 13.8 | 282 | 39 |
| Cement | 80 avg | 310 | 234 | 140 | 96 | 58 | 20.8 | 15.2 | 278 | 42 |
| 100% | 180 up | 204 | 152 | 92 | 66 | 40 | 12.8 | 8 | 180 | 30 |
| Cement | 180 dwn | 204 | 152 | 88 | 60 | 36 | 11 | 7.4 | 186 | 24 |
| 100% | 180 avg | 204 | 152 | 90 | 63 | 38 | 11.8 | 8 | 183 | 27 |
|  |  |  |  |  |  |  |  |  | cP | lb$_f$/100 ft$^2$ |

$^a$PV: Plastic Viscosity;
$^b$YP: Yield Point

Figure 2:
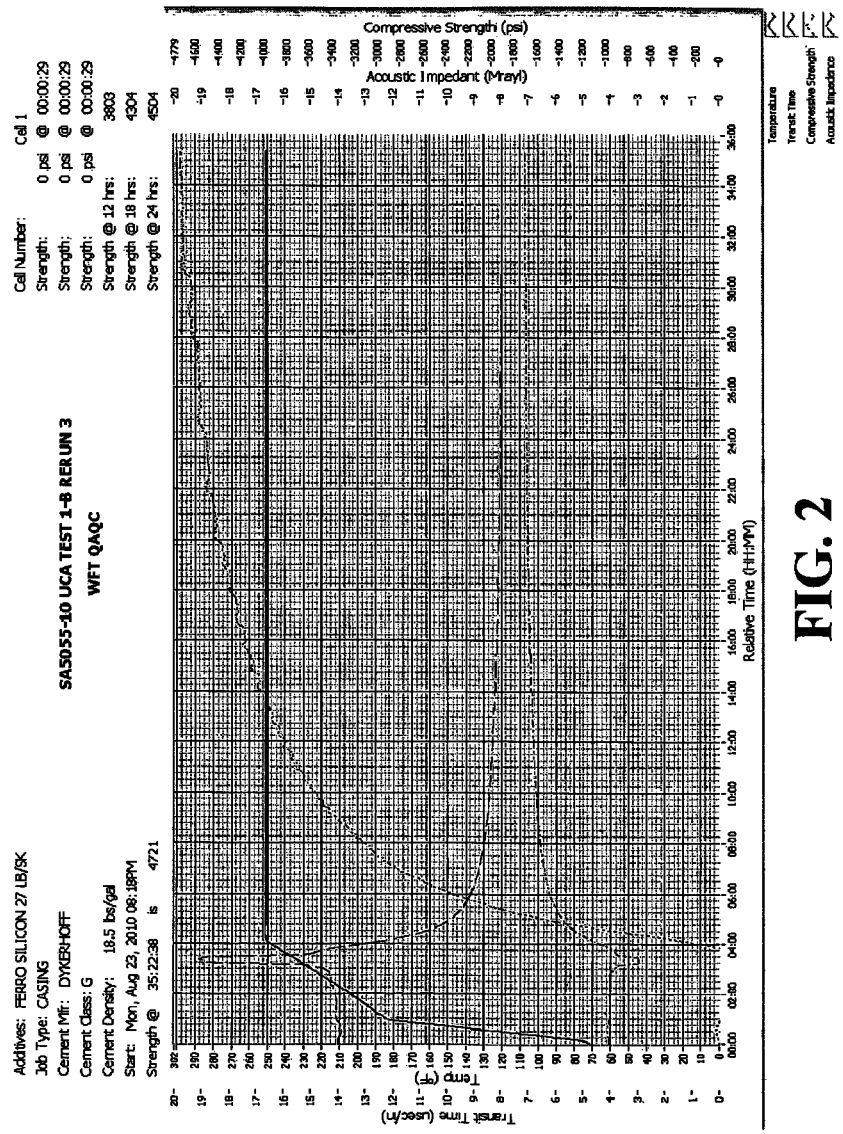
FIG. 2 depicts UCA test of a prior art cementing composition including 18.5 lbs/gal of ferrosilicon prepared by adding 27 lb/sk of ferrosilicon to the fluid.

The compressive strength chart of the comparative example are shown in FIG. 2.

From the data it is clear that the cement formulations of this invention have a significantly reduced plastic viscosity PV and a significantly reduced yield point. In certain embodiments, the cement formulations of this invention have a relatively low plastic viscosity and a relatively low yield point.

The term relatively low plastic viscosity means that the formulations of this invention including a weight equivalent amount of the weighting composition including at least one metal silicon alloy has a plastic viscosity at least about 10% lower than a formulation including a weight equivalent amount of hematite as the weighting agent. In other embodiments, the term relatively low plastic viscosity means a plastic viscosity at least about 15% lower than a formulation including a weight equivalent amount of hematite as the weighting agent. In other embodiments, the term relatively low plastic viscosity means a plastic viscosity at least about 20% lower than a formulation including a weight equivalent amount of hematite as the weighting agent.

The term relatively low yield point means that the formulations of this invention including a weight equivalent amount of the weighting composition including at least one metal silicon alloy has a yield point at least about 15% lower than a formulation including a weight equivalent amount of hematite as the weighting agent. In other embodiments, the term relatively low yield point means a yield point at least about 20% lower than a formulation including a weight equivalent amount of hematite as the weighting agent. In other embodiments, the term relatively low yield point means a yield point at least about 25% lower than a formulation including a weight equivalent amount of hematite as the weighting agent. In other embodiments, the term relatively low yield point means a yield point at least about 30% lower than a formulation including a weight equivalent amount of hematite as the weighting agent.

From FIG. 1 and FIG. 2, it is clear that the change in weighting agent has significant effect on the cement curing profile and cure state. In certain embodiments, the cement formulations of this invention have a relatively faster cure rate than compositions including a weight equivalent amount of hematite as the weighting agent, a relatively higher cure strength after 6 hours of curing relative to the compositions including a weight equivalent amount of hematite as the weighting agent, and a relatively higher final cure strength relative to compositions including a weight equivalent amount of hematite as the weighting agent. The term relatively high means that the cure rate, cure strength after 6 hours of curing and final cure strength is at least 10% faster and or higher relative to compositions including a weight equivalent amount of hematite as the weighting agent. In other embodiments, the term relatively high means that the cure rate, cure strength after 6 hours of curing and final cure strength is at least 15% faster and/or higher relative to compositions including a weight equivalent amount of hematite as the weighting agent. The term relatively high means that the cure rate, cure strength after 6 hours of curing and final cure strength is at least 20% faster and/or higher relative to compositions including a weight equivalent amount of hematite as the weighting agent.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A downhole cement composition comprising:
   a pumpable cement slurry including:
      water;
      a hydraulic cement; and
      from 25 wt. % to 110 wt. % of a primary weighting agent, based on the weight of the hydraulic cement in the absence of the primary weighting agent, including a ferrosilicon having a density of at least 6.0 g/cm$^3$,
   where the primary weighting agent increases the density of the downhole cement composition, while maintaining other properties including at least pumpability, gas tight sealing, reduced tendency to segregate, and/or reduced high temperature cement strength retrogression, and where the composition has (1) a plastic viscosity at least 10% lower than a composition including an equivalent amount of hematite as the weighting agent, (2) a yield point at least about 15% lower than a composition including an equivalent amount of hematite as the weighting agent, (3) a cure rate at least 10% faster than a composition including an equivalent amount of hematite as the weighting agent, and (4) a cure strength after 6 hours of curing and a final cure strength at least 10% higher than a composition including an equivalent amount of hematite as the weighting agent.

2. The composition of claim 1, further including:
   a gelling agent,
   a dispersant, and/or
   a fluid loss control additive.

3. The composition of claim 1, wherein the ferrosilicon has a density of at least 6.5 g/cm$^3$.

4. The composition of claim 1, wherein the weighting agent comprises a powder having particles between 100 nm and about 500 μm.

5. A downhole cementitious composition comprising:
   a pumpable cement slurry including:
      a Portland cement;
      from about 25 wt. % to about 110 wt. % of a primary weighting agent, based on the weight of the Portland cement in the absence of the primary weighting agent, comprising a ferrosilicon having a density of at least 6.0 g/cm$^3$ and a particle size distribution between 10 nm and 1 mm; and
      water,
   where the primary weighting agent increases the density of the downhole cementitious composition, and where the composition has (1) a plastic viscosity at least 10% lower than a composition including an equivalent amount of hematite as the weighting agent, (2) a yield point at least about 15% lower than a composition including an equivalent amount of hematite as the weighting agent, (3) a cure rate at least 10% faster than a composition including an equivalent amount of hematite as the weighting agent, and (4) a cure strength after 6 hours of curing and a final cure strength at least 10% higher than a composition including an equivalent amount of hematite as the weighting agent.

6. The composition of claim 5, further comprising:
   a dispersing agent;
   a gelling agent; and/or
   a fluid loss control additive.

7. The composition of claim 5, wherein the ferrosilicon has a density of at least 6.5 g/cm$^3$.

8. The composition of claim 5, wherein the weighting agent comprises a powder having particles between 100 nm and about 500 μm.

9. The composition of claim 1, further comprising:
   a secondary weighting agent including iron, steel, barite, hematite, iron ores, tungsten, tin, manganese, manganese tetraoxide, calcium carbonate, illmenite, sand, or mixtures thereof.

10. The composition of claim 5, further comprising:
    a secondary weighting agent including iron, steel, barite, hematite, iron ores, tungsten, tin, manganese, manganese tetraoxide, calcium carbonate, illmenite, sand, or mixtures thereof.

* * * * *